United States Patent [19]

Flanagan et al.

[11] 4,269,217
[45] May 26, 1981

[54] SEPARATOR VALVE

[76] Inventors: James P. Flanagan, P.O. Box 245;
Jack L. Carter, P.O. Box 464, both of
Hooker, Okla. 73945

[21] Appl. No.: 80,223

[22] Filed: Oct. 1, 1979

[51] Int. Cl.$^3$ .............................................. F16T 1/00
[52] U.S. Cl. ...................................... 137/183; 137/204
[58] Field of Search ......................... 137/183, 204, 199

[56] References Cited

U.S. PATENT DOCUMENTS

| 1,747,456 | 2/1930 | Noble | 137/183 |
| 3,018,023 | 1/1962 | Talarico | 137/183 X |
| 3,536,090 | 10/1970 | Scott | 137/183 |
| 3,769,999 | 11/1973 | Flanagan | 137/183 |

Primary Examiner—Alan Cohan
Attorney, Agent, or Firm—John Howard Joynt

[57] ABSTRACT

Valve for separating liquids out of gases, as in gas-well-to-customer operations, being an improvement of the valve described in our U.S. Pat. No. 3,769,999 of Nov. 6, 1973, entitled "Liquid Separator System and Apparatus". The valve comprises a body with enlarged inlet chamber, a rising passage communicating therewith, a circumferential groove about the rising passage, downwardly-extending passages spaced on opposite sides of the rising passage and extending to an outlet chamber. The valve includes a head chamber with floating disc positioned within the same and seating atop the rising passage and circumferential groove, the floating disc being provided on the underside thereof with a radial groove to bleed off fluid in the head chamber and one or more further grooves to control fluid coming from the rising passage. A spring also is positioned within the head chamber, eccentrically pressing on the disc to permit instantaneous filling of head chamber under gas operation and quick closing of the valve under head pressure. An outlet fitting engages the valve in communication with the outlet chamber, the fitting being provided with central orifice to effect desired back pressure under gas operation.

5 Claims, 4 Drawing Figures

SEPARATOR VALVE

BACKGROUND OF THE INVENTION

In the oil and natural gas industries, especially in gathering gas from a flowing natural gas well, we find that a certain amount of condensate occurs in the gas stream. This condensate is in the form of liquid hydrocarbons. And it is most desirable that the condensate, as well as any distillate, foreign matter or the like which may be present, should be separated from the gas stream before passing the gas on to the consumer. Actually, it is necessary that the condensate, distillate and the like be separated well in advance of passing the gas through a measuring device and thence on to the consumer-purchaser.

While various proposals have been advanced for removing condensate, salt water and even solid foreign matter from gas lines; namely, by way of float controls, constant gas-bleed pilot controls, diaphragm-operated motor valves and low pressure pilot regulators, the separating apparatus, equipment and devices employed are lacking in one or more characteristics. More particularly, some of the apparatus, equipment and devices of the prior art are large, heavy and cumbersome, weighing 75 to 100 pounds or more. And much of the same becomes unreliable even in moderate temperature operation; that is, at temperatures only so low as 60° F. Additionally, most of the apparatus, equipment and devices of the prior art are quite costly to produce as well as costly to install and maintain. Even at best, the facilities of the prior art do not adequately and reliably separate out the condensate, distillate and the like from the gas stream.

While many of the problems of gas field operation are solved with the valve of our prior invention, as described in the patent noted, we feel that there is a significant waste of gas, especially on long periods of continuous dry operation; that is, some two or three hours. This we largely attribute to a sticking of the valve in open position when completely dry as well as to some sluggishness in operation under the high gas pressures involved. Moreover, operation of the valve is somewhat erratic under prolonged conditions, possibly due to partial and unpredictable sticking.

One of the particular objects of our invention, therefore, is to provide an improved valve of simple, efficient, reliable and comparatively inexpensive construction, with a minimum of moving parts, for automatic removal of condensate, distillate, foreign matter and the like from a natural gas line, this in order to supply liquid-free gas to the purchaser-consumer.

Another object is to provide such a valve of improved efficiency, with minimum waste of gas, which, moreover, is suited to various oil field applications as, for example, in dumping accumulated liquids in drips on gas lines, removing liquid condensate from headers supplying gas compressors, and in general to relieve fuel lines and the like from liquid problems.

SUMMARY OF THE INVENTION

We feel that much of the problem in separating out the liquid components from the gas stream coming from the well, principally methane and ethane but containing some of the higher hydrocarbons in liquid form, derives from the circumstance that the liquid hydrocarbons are characterized by critical points of pressure below which liquid flashes into the gaseous state, or above which the gas sharply converts to the liquid state. Particular reference is made to normal butane with a boiling point at atmospheric presure of 31° F., isobutane with a boiling point of 11° F., and normal pentane with a boiling point of 97° F.. At constant temperature rather than constant pressure, their several boiling points or flash points lay within a range which we find must be reckoned with. And with the valves of the prior art, one or more of the hydrocarbons encountered in natural gas field operations flash over from liquid to gas upon passing through the trap and sharply interrupt operation of the same.

In the liquid separator system and apparatus of our invention, there is provided a sealed or closed separator tank located at some desirable point in a natural gas line. Gas passing through the line at high velocity is fed into the tank and thence out and away from the tank to the consumer. Condensate, distillate and the like tend to accumulate in the tank, this by virtue of gravity action. The level of the accumulated liquid is maintained at a constant value by way of a tube conveniently located midway between the top and bottom of the tank. Fluid appearing at the inner portion of the tube, whether it be gas or liquid, is passed on to what we call a liquid separator valve located outside of the tank. The tube serves to stabilize the fluid column before passing the same on to the valve. And the valve serves the function of freely passing liquid from the tank to the exterior, conveniently an outside storage tank, and yet closing off the passage of gas when the level of the liquid in the separator tank falls below the tube inlet.

Now the valve of our invention comprises a body fashioned of stainless steel with enlarged entering chamber, conveniently cylindrical and horizontal, connecting with the intake tube. This chamber communicates with a passage of lesser dimension accepting fluid from the separator tank and passing it on to a vertical rising passage letting into an enlarged head chamber.

Resting atop the rising passage noted is a floating disc, the function of which appears more fully hereinafter. The construction of the valve is such that a solid column of gas-free liquid impinges on the bottom of the floating disc. A full liquid cycle of operation is assured without the presence of overriding gas.

The valve body is further provided with a circumferential groove and a plurality of downwardly-extending passages, spaced about the rising passage. For a best combination of results we provide at least one downwardly-extending passage on one side of the rising vertical passage and another on the opposite side of the same. The downwardly-extending passages lead into an outlet chamber in the body of the valve. Secured to the valve body, as by threaded engagement, we provide a fitting with central orifice of desired dimension, the dimension being determined by the particular installation, especially the quantity of liquid to be handled, the density of the liquid and the relative proportions of liquid and gas involved. Under gas operation the orifice disc serves to create a back-pressure directly aiding valve operation.

Particularly, control, whether under gas operation or liquid operation, is had by way of the floating disc mentioned which seats atop the vertical rising passage of the valve body and circumferential groove connecting with the downwardly-extending passages to outlet. This disc is fashioned of a hardened stainless steel and is of a dimension falling just short of the head chamber. And in accordance with the teachings of our invention, a spring is positioned within the head chamber and eccentrically presses on the disc in order to assure the cocking of the disc under the action of entering gas, with resultant quick filling of head chamber and the quick downward flap of the disc, all as explained more fully below. Wasting of gas is minimized.

While seating on top of the rising passage and circumferential groove, the disc is free to move upwardly against spring action in sufficient amount to permit a flow of liquid, the upward movement being arrested by a nub on the upper wall of the chamber. Liquid from the separator tank entering the inlet tube and passing into the inlet chamber of the valve body and thence to the rising passage impinges against the disc, lifts the same and is deflected radially outwardly and then downwardly into the circumferential groove around the rising vertical passage and into the downwardly-extending passages, thence to the outer chamber, the orifice disc and to the exterior. The floating disc is held in its upward position against the nub on the upper wall of the head chamber by virtue of the continued flow of the liquid. And with this flow there is a self-cleaning action throughout.

When the level of the liquid in the separator tank has fallen to a point at or immediately below the inlet tube, the flow of gas commences under the pressures involved. Gas entering the inlet tube and passing into the separator valve is directed upwardly against the bottom surface of the floating disc. As a result of the spring pressure applied eccentrically against the upper surface of the disc, the disc is cocked and gas rushes into the head chamber. Moreover, with the flow of gas there develops a reduced pressure beneath the surface of the disc. This action is known as the "Bernoulli effect". As a result of the combined effects of the head chamber pressure and the reduced pressure on its lower surface, the disc snaps down and blocks the further flow of gas. The disc maintains the closed position under the action of the head chamber pressure acting on the entire upper surface of the disc, as against the pressure on the lower surface acting only on the smaller surface in communication with the rising passage of the valve body.

In our valve construction we employ a radial groove on the lower surface of the floating disc, which bleeds off gas from the head chamber around the edge of the disc and into the circumferential groove and out through downward passages and into the outlet chamber and thence to the exterior. When the head pressure is sufficiently reduced, the disc flies up under the action of the gas in the inlet passage. Gas instantaneously enters the head chamber, again flapping down the disc and closing the valve. On gas, the valve usually cycles every three to ten seconds. For the faster cycling a radial groove of coarser section is employed, giving faster bleed-off. And, of course, for the desired slower cycling, a groove of lesser dimension and slower bleed-off is employed. Some three or four different floating discs are kept in supply.

As a further feature we also employ one or more additional grooves on the underside of the floating disc. These serve to effect a mixing of the fluid (gas or liquid or a combination) impinging on the disc, giving a certain uniformity and distribution of pressures along with a cleansing action. For a best combination of results one groove overlies the inlet passage and another is in the form of a circumferential groove overlying the circumferential groove in the head chamber.

When liquid in the separator tank again rises, it is liquid that enters the valve quickly forcing the disc upwardly and permitting the direct flow of liquid through the valve and to the exterior as described below.

Our invention then may be viewed as comprising a novel combination of structural elements, arrangement of parts and interrelation between each of the same with one or more of the others, all as described herein, the nature of which invention is more particularly set out in the claims at the end of this specification.

DESCRIPTION OF THE DRAWINGS

In the accompanying drawings illustrating a preferred embodiment of our invention.

Like reference characters denote like parts throughout the several views of the drawings.

DESCRIPTION OF THE PREFERRED EMBODIMENT

Figure 1:
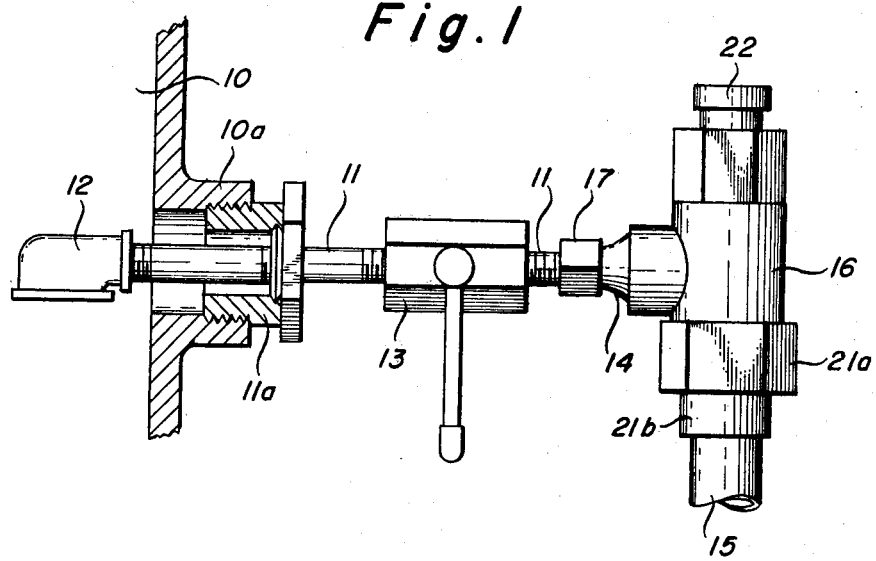
FIG. 1 presents an elevation view of the value of our invention as connected with the separator tank employed in the pipeline of a natural gas well.

Turning now more particularly to the practice of our invention, attention is directed to FIG. 1 of the drawings, in which we disclose the exterior wall of a separator tank 10 with appropriate line coming in from the gas field and line going on to the consumer, neither line being shown.

An inlet line 11, with appropriate connection 11a threadedly engaging boss 10a on wall of tank 10, conducts fluid from the tank by way of inlet funnel 12, shut-off valve 13, nipple 14, to separator valve 16 and line 15.

Now the fluid maintained within the tank is of substantial pressure, this ordinarily amounting to some 200 to 400 pounds per square inch (psi), although it well may range from 20 to 1,000 psi. The liquid in the tank is forced into funnel 12 and thence by way of inlet tube through control valve 13 on to the separator valve 14 and dump line 15 to a receiving tank (not shown) or otherwise to the exterior where atmospheric pressures obtain. The pressure differences across the separator valve; that is, from inlet at 20 to 1,000 psi and outlet at atmospheric pressure, may be almost 1,000 psi. Ordinarily the difference is about 200 to about 400 psi. With excessive pressure drop across the valve there is a drop in temperature (a drop in pressure of about 100 psi causes a drop in temperature of about 10° F.), this with the formation of water which very well may freeze.

Figure 2:
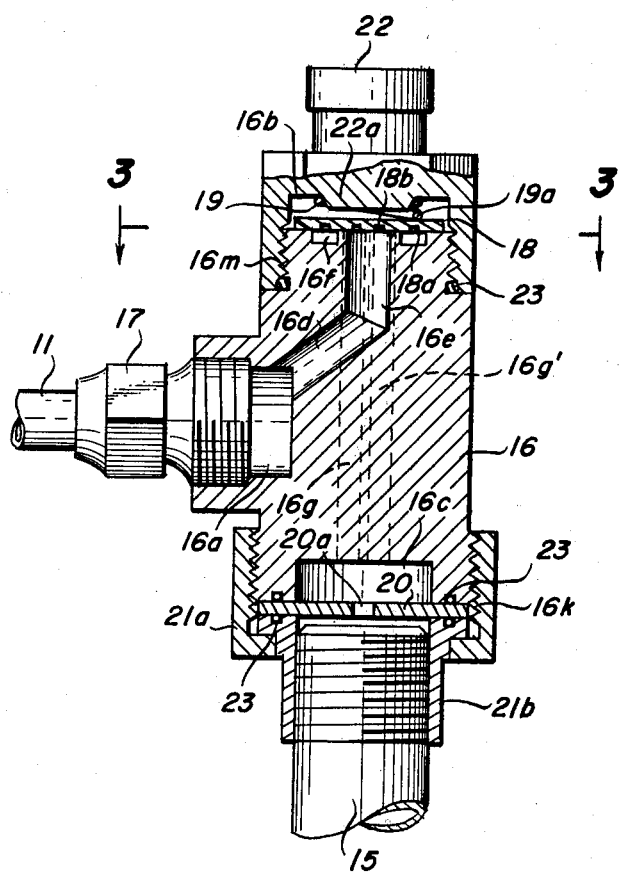
FIG. 2 shows in elevation, largely in section and on enlarged scale, the separator valve shown in FIG. 1.
Figure 3:
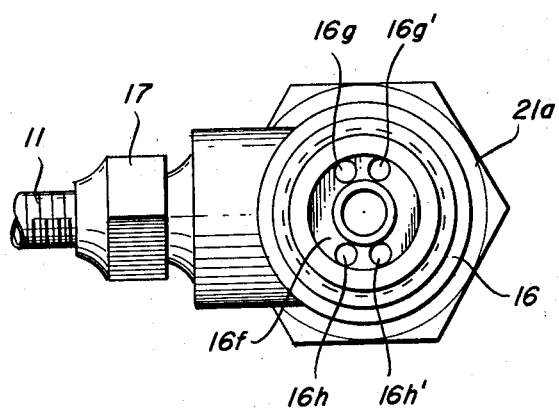
FIG. 3 is a plan view of the value of FIG. 2, taken along the line 3—3.

Our separator valve (see FIGS. 2 and 3) comprises a body portion 16 conveniently fashioned of stainless steel, with inlet chamber 16a, head chamber 16b and outlet chamber 16c. Fluid (here liquid or gas) enters valve 16 by way of inlet tube 11 suitably connecting with inlet chamber 16a by way of coupling 17. The chamber 16a is of substantial dimension and lets off into an upwardly-slanting passage 16d of reduced dimension, this communicating with a vertical rising passage 16e which serves to conduct fluid upwardly. For best results passage 16d takes off at the top of chamber 16a. This construction minimizes turbulence and, moreover, serves to eliminate the likelihood of gas entrapment at the top of the chamber.

Figure 4:
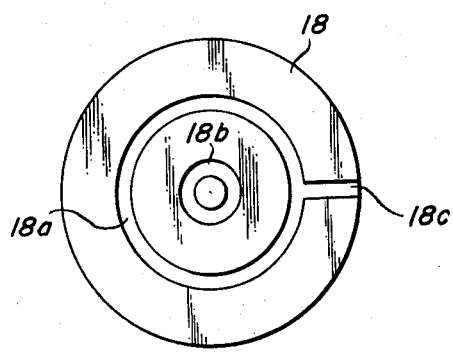
FIG. 4 is a detached view of the floating disc employed in our valve as seen from the underside thereof.

Seated atop the vertical rising passage 16e is a floating disc 18, against which is presented the column of fluid. This disc is of somewhat smaller dimension than that of the head chamber 16b, so as to allow a small space between the outer edge of disc 18 and head chamber walls 16a. Disc 18 is provided with a radial groove 18c on the underside thereof to bleed off the liquid or gas in the head chamber. Moreover, disc 18 is provided with one or more further grooves on the undersurface thereof to effect a mixing of entering fluid. Best results are had where two additional grooves are provided (see FIG. 4), an outer groove 18a of such distance out as to overlie circumferential groove 16f in the valve body (see FIG. 2) and an inner groove 18b overlying the vertical rising passage 16e. Should either a more sensitive or less sensitive floating disc be required, as noted above, ready exchange of discs is had by unscrewing valve head 22, threadedly engaging valve 16 as at 16m and making the desired replacement. "O" rings 23 assure a tight seal.

A coiled spring 19 is positioned about boss 22a with a tip 19a pressing eccentrically on disc 18 to effect a tilt with a rising of the disc under the action of gas pressure, all as explained more fully hereinafter.

The flow of gas, liquid or mixtures of the same, entering valve 16 and proceeding from inlet chamber 16a, slanting passage 16d and vertical rising passage 16e, is initially blocked by floating disc 18 seating atop the vertical rising passage. Upon lift of the diasc, however, as dealt with in detail hereinafter, the fluid enters circumferential groove 16f provided in the valve body and downwardly through balanced passages to outlet chamber and thence to the exterior. For a best combination of results, the downwardly-extending passages are in the form of twin passages 16g and 16g'', located on one side of rising passage 16e and further twin passages 16h and 16h'', located on the other side of the rising passage. The paired twin passages serve to minimize turbulent effects at the critical point which is below disc 18 and provide balance to the outward flow communicating with outlet chamber 16c (see FIG. 3).

Now in the operation of our valve, the fluid, whether gas, liquid or mixtures of the same, finding its way to the outlet chamber, is restricted in its flow by way of orifice disc 20. Disc 20 is maintained in position by way of coupling 21a–21b, with part 21a threadedly engaging the valve body 16a at 16k. The disc 20 is provided with a central orifice opening 20a of a size dimensioned according to the proportion of gas and liquid normally coming from the gas well and the pressure expected. The orifice disc serves to provide a back-pressure on the gas, liquid or mixture of the same being dealt with, in order that a liquid state may be preserved. As noted above, at the usual temperatures of valve operation, a pressure in excess of a critical minimum figure must be maintained, for otherwise the liquid component flashes over to the gaseous state, with the result that the valve closes prematurely.

In gas field operations a series of orifice discs 20 are available with differing dimensions of orifice 10a. For wells with a high proportion of condensate, distillate of the like, or of the heavier hydrocarbons, a disc of larger orifice dimension is selected. For a well producing a lesser proportion of liquid or of lighter hydrocarbons, a disc with smaller orifice is employed. The orifice serves to achieve a desired back-pressure to assure effective valve operation; is not intended to control the volume of liquid passing through the valve, although that result necessarily is acheived.

As a specific example, with a 66 gravity fluid, a 13/64 inch orifice conveniently is employed; with a larger orifice the separator valve very well may fail to open and the liquid then would be carried on to the consumer along with the gas. Provision is made for quickly disconnecting outlet fitting 21a–21b and inserting the interchangeable orifice disc of either larger or smaller orifice as desired. Some five or six different orifice discs are in supply.

In gas field operation, gas, liquid and mixtures of the same coming from the field, are taken into closed tank 10 on the way to the consumer. With a substantial accumulation of the liquid component, the surface rises within the tank and liquid enters valve 16 from tank 10 by way of funnel 12, line 11, control valve 13, and fittings 14 and 17 (see FIG. 1). The liquid proceeds to the entering chamber 16a of the valve, thence through upwardly- slanting passage 16d and vertical rising passage 16e, as described above, and impinges on the lower central surface of disc 18. The force is sufficient to sharply move disc in an upwardly direction against the action of spring 19 (see FIG. 2), the disc striking nub 22a of valve head 22.

The liquid quickly flows radiantly outwardly and into circumferential groove 16f, thence downwardly through the paired twin passages 16g–16g' and 16h–16h' and to outlet chamber 16c. From the outlet chamber the liquid passes through orifice 20a and line 15 to the exterior; that is, to a suitable storage tank or other facility not shown. Note that in passing from head chamber to exterior the only impediment to the flow is orifice disc 20. The straight-line outward flow creates no significant back- pressure; the back-pressure thus is limited and controlled entirely by orifice disc 20, this being interchangeable to give the particular back-pressure required for any particular gas well product.

Now the flow from tank 10 thorugh valve 16 to the exterior continues until the surface of the liquid falls to the level of inlet funnel 12. It is at this point that gas under pressure in the upper portions of tank 10 enters funnel 12 to separator valve 16 by way of line 11, cut-off valve 13 and fittings 14 and 17 (see FIG. 2), the gas entering chamber 16a and proceeding upwardly through slanting passage 16d, vertical rising passage 16e and impinging upon the spring-loaded floating disc 18. And with the flow of this gas under high pressure, the gas striking the disc is inclined to proceed radiantly outwardly. Impingement of the high pressure gas on disc 18 instantaneously lifts the disc in somewhat cocked position because of the eccentric spring loading. The head chamber 16b quickly fills. Moreover, because of the "Bernoulli effect" of the flow of gas beneath the disc, a reduction of pressure is had and the disc snaps down to block any further flow of gas. The almost instantaneous action results from a combination of the pressure almost immediately obtaining on the upperside of the disc and the reduced pressure on the underside of the disc. The disc tends to remain in closed position because the pressures on the upperside, acting througout the entire upper surface, overcome the pressure on teh lower side, acting solely on the small area communicating with the vertical rising passage.

In the operation of our valve the pressures obtaining in head chamber 16b are relieved by way of a radial groove 18c on the under surface of disc 18. Gas in chamber 16b gradually is bled off by way of groove 18c into circumferential groove 16f and thence to the exterior through outlet chamber 16c, orifice 20a and outlet line 15. When the head pressure sufficiently falls, the disc snaps up; that is, the valve is suddenly opened and the gas cycle is repeated, as described above. We find that the valve closes when the head pressure amounts to about 40% of the inlet pressure. The valve opens when the head pressure falls to about 23% of the inlet pressure. In operating on gas the valve cycles about every three to ten seconds as noted above.

With the eccentric spring-loading of the disc and the resultant cocking of the same, uniform and reliable action is had, with the result that there is a minimum loss of gas to the exterior. The eccentrically-spring-loaded disc, however, in no sense minimizes the action of the valve under liquid operation.

It will be seen that we provide in our invention a separator valve which is simple in construction, light in weight (about 2 pounds), easy to install and inexpensive to maintain; which valve quickly, reliably and automatically separates liquid from gas in gas field operation. In many installations fluid is not present at all times; that is, neither gas nor liquid nor mixtures of the same. With our prior valve, as noted above, where no fluid is being dumped for several hours, the valve in dry cycling may fly open and stay open, losing a considerable amount of gas to the outlet. The metal-to-metal seal between the floating disc and the seating surface in the head chamber appears to be inadequate when the valve becomes dry. In the separator valve of present interest, however, with eccentrically spring-loaded disc, effective sealing is had even where the valve is continuously operated for several hours by gas which is completely dry; sticking and loss of gas to the exterior is avoided.

While our separator valve is particularly suited to gas field operations, we find that the valve with spring-loaded disc is suited to glycol recovery operations, wherein glycol commonly is carried over by a gas stream. Moreover, our valve is suited to placement in a gas compressor line wherein the valve is introduced ahead of the compressor, serving to dump off liquid which otherwise may enter the compressor with detrimental result. Our valve also is suited to gas line systems in general to eliminate fluids which may be present.

Since many embodiments may be made of our invention and since various changes may be made in the embodiment described above, it is to be understood that all matter described herein or shown in the accompanying drawings is to be taken as illustrative and not by way of limitation.

We claim:

1. In natural gas field operations, a valve for separating out liquid from the gas comprising in combination a body portion with inlet chamber, head chamber and outlet chamber, said valve including a passage of smaller dimension extending upwardly from said inlet chamber to said head chamber; a plurality of unobstructed downwardly-extending outlet passages from said head chamber to said outlet chamber; a circumferential groove about said inlet passage, communicating with said plurality of downwardly-extending outlet passages; a floating disc positioned within said head chamber for sealing off communication between said upwardly-extending passage and said circumferential groove, said disc being smaller than chamber and having a radial groove and at least one circumferential groove on the underside of the same; a spring seated within said head chamber and acting downwardly and eccentrically on said disc; and an outlet fitting with restricted orifice therein communicating with said outlet chamber.

2. In natural gas field operations, a valve for separating out liquid from gas, comprising in combination a body portion with horizontal inlet chamber, head chamber and vertical outlet chamber, said valve including a passage of smaller dimensions extending upwardly from the top interior surface of said inlet chamber to said head chamber; a plurality of vertically downwardly-extending outlet passages from said head chamber to said outlet chamber; a circumferential groove about said inlet passage communicating with said plurality of downwardly-extending outlet passages; a floating disc smaller than chamber positioned within said head chamber for sealing off communication between said upwardly-extending passage and said circumferential groove under pressure of gas within said head chamber, said disc having a radial groove and a plurality of additional grooves on the underside of the same respectively overlying the inlet passage and the circumferential groove about the inlet passage; a coil spring seated against the roof of said head chamber and having one end eccentrically contacting said disc to give a tilt to the same under the pressure of gas entering the valve, thereby permitting instantaneous filling of head chamber to downwardly flap said disc and close off communication between said upwardly- and downwardly-extending passages; and an outlet fitting with restricted orifice therein communicating with said vertical outlet chamber.

3. A valve for separating out liquid from gas, comprising in combination a body portion with inlet chamber, head chamber and outlet chamber, said valve including a central axial passage of smaller dimension extending upwardly from said inlet chamber to a mid-point of said head chamber; a plurality of unobstructed downwardly-extending outlet passages uniformly spaced about said upwardly-extending axial passage and communicating with said outlet chamber; a circumferential groove about said inlet passage communicating with said plurality of said downwardly-extending outlet passages; an eccentrically spring-loaded floating disc smaller than chamber positioned within said head chamber for sealing off communication between said upwardly-extending passage and circumferential groove, with radial groove on the underside of the disc to bleed off head chamber pressure and at least one circumferential groove, this overlying the circumferential groove about said inlet passage; and an outlet fitting with restricted orifice therein, communicating with said outlet chamber.

4. Valve for separating out liquid from gas, comprising in combination a body portion with inlet chamber, head chamber and outlet chamber, said valve including a central axial passage of smaller dimensions extending upwardly from the top interior surface of said inlet chamber to a mid-point of said head chamber; a plurality of vertically downwardly-extending outlet passages uniformly spaced about said upwardly-extending axial passage and communicating with said outlet chamber; a circumferential groove about said inlet passage communicating with said plurality of downwardly-extending outlet passages; an interchangeable floating disc smaller than chamber positioned within said head chamber having a radial groove and at least one circumferential groove and on the underside thereof; a coil spring seated against the roof of said head chamber and having one end eccentrically contacting said disc to give a tilt to the same under the pressure of gas entering the valve, thereby permitting instantaneous filling of head chamber to downwardly flap said disc and close off communication between said upwardly- and downwardly-extending passages; and an outlet fitting with restricted orifice therein, communicating with said outlet chamber.

5. Valve for separating out liquid from gas, comprising in combination a body portion with inlet chamber, head chamber and outlet chamber, said valve including a passage of smaller dimensions extending upwardly from said inlet chamber to said head chamber; a plurality of unobstructed downwardly-extending outlet passage from said head chamber to said outlet chamber; a circumferential groove about said inlet passage communicating with said plurality of downwardly-extending outlet passages; an interchangeable floating disc smaller than chamber positioned within said chamber and having a radial groove and two other grooves on the underside thereof, one of such grooves overlying the rising passage in said valve and the other overlying the circumferential groove about said inlet passage; a spring seated within said head chamber and contacting said disc eccentrically to give a tilt to the same under the pressure of gas entering the valve; and an interchangeable outlet fitting with central restricted orifice therein communicating with said outlet chamber.

* * * * *